United States Patent [19]

Wagster

[11] 4,352,489
[45] Oct. 5, 1982

[54] SMALL COMPACT LIGHTWEIGHT PORTABLE VISE SUITABLE FOR USE BY MODEL MAKERS AND HOBBYISTS

[75] Inventor: Robert P. Wagster, Greensboro, Md.

[73] Assignee: Black & Decker Inc., Newark, Del.

[21] Appl. No.: 197,062

[22] Filed: Oct. 15, 1980

Related U.S. Application Data

[63] Continuation of Ser. No. 42,778, May 29, 1979, abandoned.

[51] Int. Cl.³ .............................................. B23Q 1/04
[52] U.S. Cl. .................................... 269/75; 269/139; 269/219; 269/97
[58] Field of Search ............................... 248/181, 276; 81/177 UJ; 269/75, 82–85, 139, 97, 219–220, 229, 283, 285, 286, 273

[56] References Cited

U.S. PATENT DOCUMENTS 758,838  5/1904  Hermann .............................. 269/273
3,997,752 12/1976 Sass et al. .............................. 269/286
4,095,778  6/1978 Wing ..................................... 269/139

FOREIGN PATENT DOCUMENTS 979461 12/1975 Canada ................................. 269/283
716367  6/1942 Fed. Rep. of Germany ........ 269/75
804788  4/1951 Fed. Rep. of Germany ........ 269/75

*Primary Examiner*—Robert C. Watson
*Attorney, Agent, or Firm*—Edward D. Murphy; Walter Ottesen; Harold Weinstein

[57] ABSTRACT

An improved vise for supporting a workpiece during moderate to light working operations comprises first and second jaw members and a support means formed of a polymer plastic. The support means comprises a support body for the jaw members and a base body. The support body includes a bowl shaped member which is received in a cavity of the base body. A restraining means enables repositioning of the support body at a plurality of different orientations and for restraining the body at a selected orientation.

5 Claims, 17 Drawing Figures

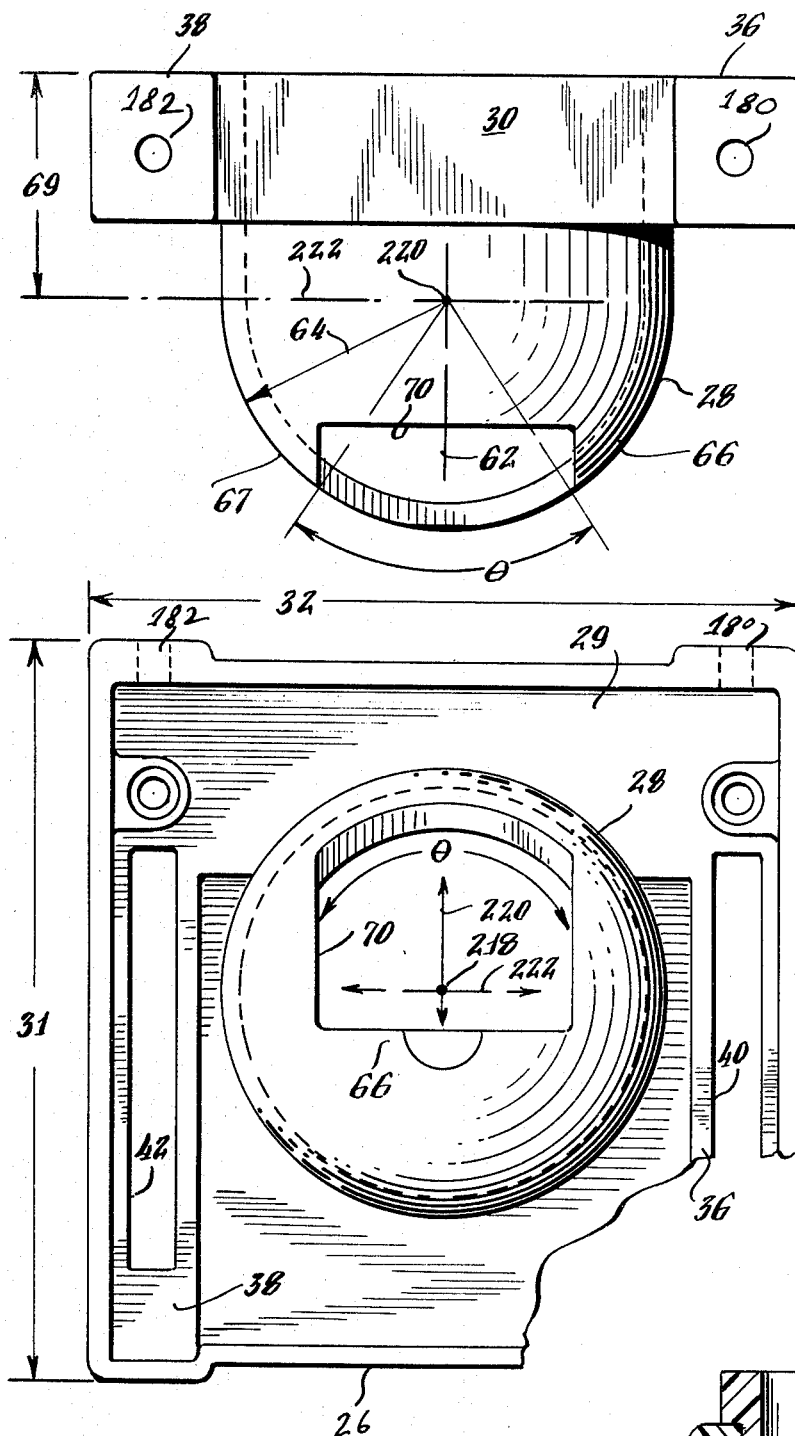
Fig. 4.
Fig. 3.
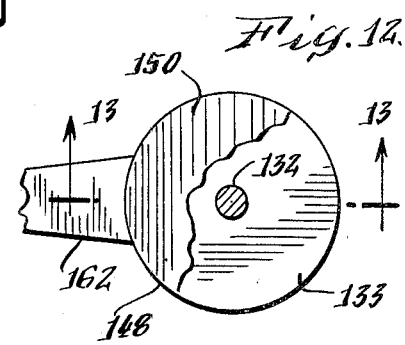
Fig. 12.
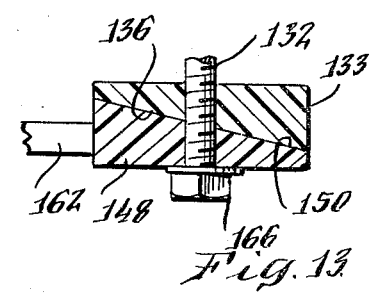
Fig. 13.
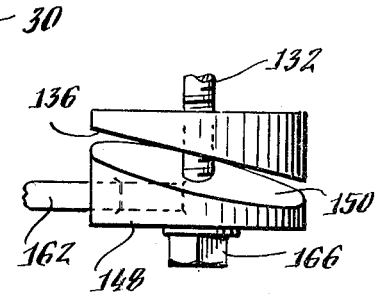
Fig. 14.
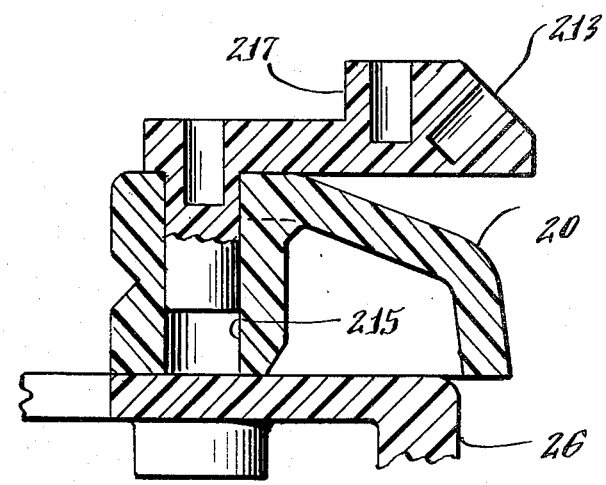
Fig. 16.

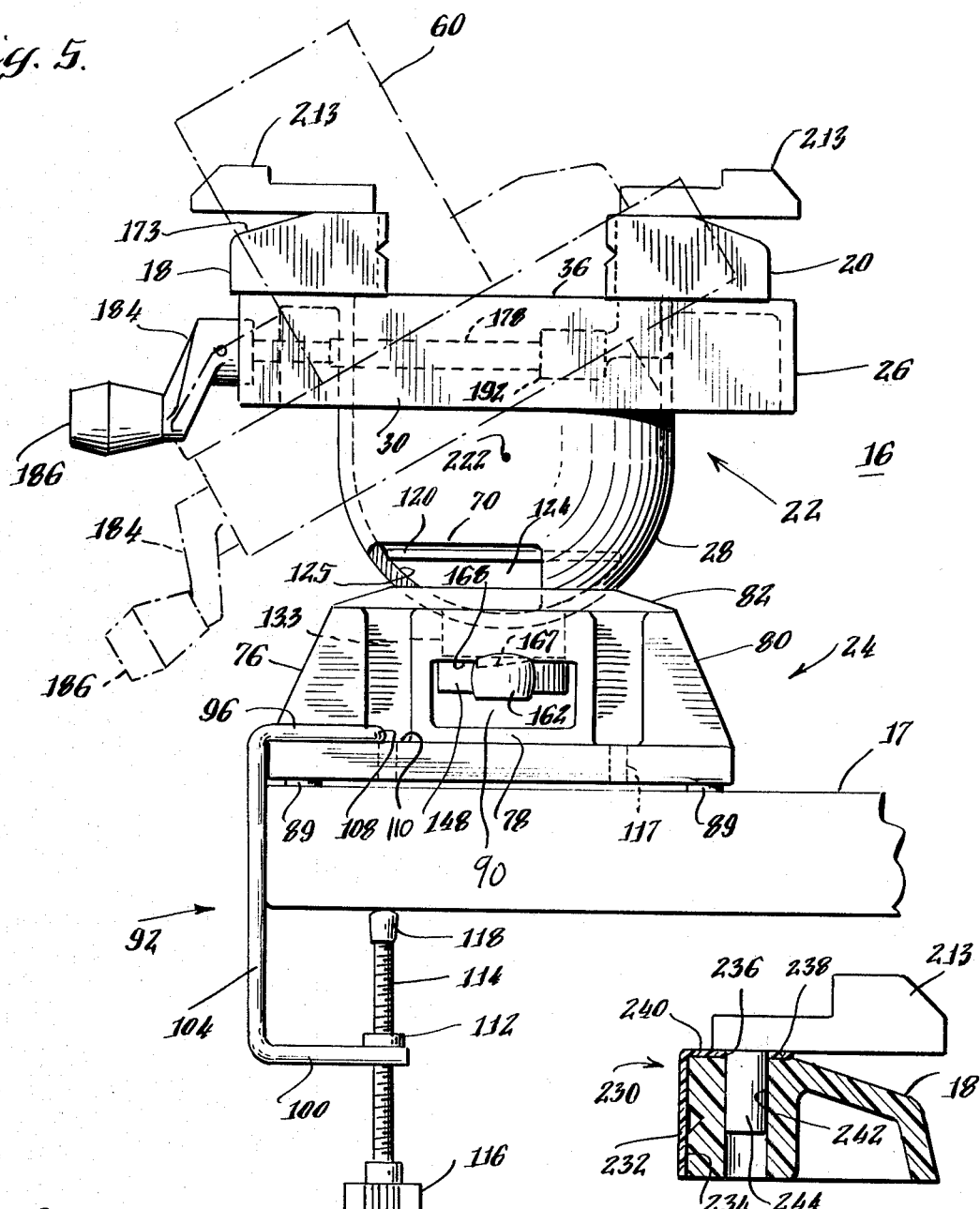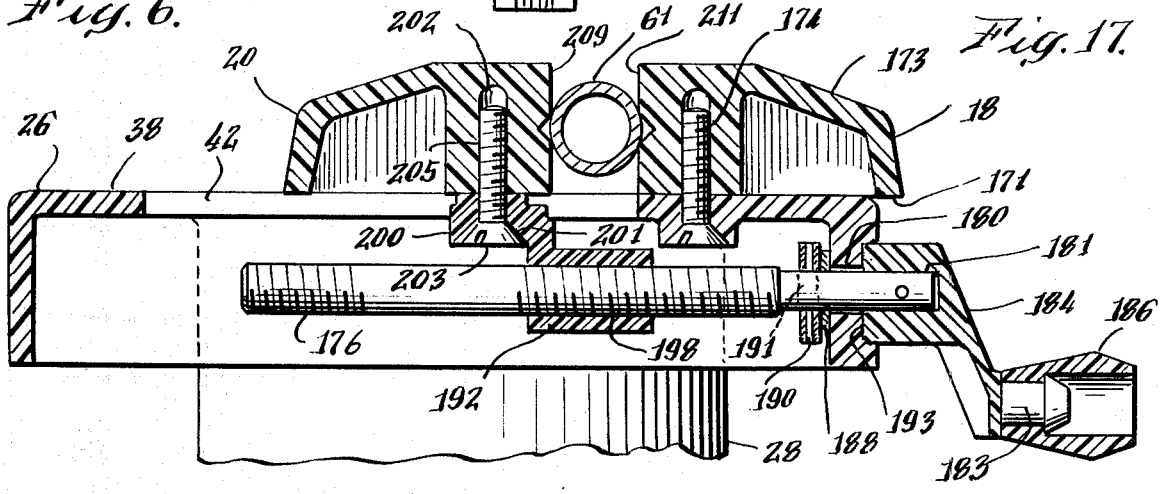

SMALL COMPACT LIGHTWEIGHT PORTABLE VISE SUITABLE FOR USE BY MODEL MAKERS AND HOBBYISTS

CROSS-REFERENCE TO RELATED APPLICATION

This application is a continuation of application Ser. No. 042,778, filed May 29, 1979, and now abandoned.

BACKGROUND OF THE INVENTION

1. Field of the Invention

This invention relates generally to apparatus for supporting a workpiece. The invention relates more particularly to an improved vise for supporting a workpiece which is subjected to relatively moderate to light working operations.

2. Description of the Prior Art

Bench top vises are known for gripping and supporting a workpiece during a working operation on the workpiece. These vises generally include a vise body having a pair of gripping jaw members which are forced into engagement with, and sandwich, a workpiece therebetween. Relative motion between the jaw members for gripping or releasing a workpiece is provided by the rotary motion of a lever actuated screw which engages internally threaded segments of the jaw members. A means is provided for mounting the vise body to a table surface or bench top for rigidly securing the vise during a working operation. Typical mounting means comprise bolts, lag screws and clamps.

At times a working operation is facilitated by rotating the vise body and the gripped workpiece in order to present the workpiece at a more convenient attitude. To this end, a means has been provided for rotating the vise about various axes. In addition, a vise is also often required to grip an elongated workpiece such as a pipe. Both the construction of the vise and its mount to a workbench can interfere with such use. These limitations have been circumvented by off center gripping of the workpiece and mounting of the vise. The jaw actuating screw is generally positioned at a centrally located position beneath the jaws thus necessitating positioning of an elongated workpiece at an off center location between the jaws so as to by-pass the transversely extending screw. The vise body must also be mounted to provide bench overhang for enabling a non-interferring extension of an elongated workpiece.

The working operations to which a vise supported workpiece are subjected include, for example, forming and shaping by pounding, hammering, filing, grinding, shearing, heating, welding, soldering, etc. In order to sustain the various working operations, some of which impose relatively large and severe impact forces on the vise, the bench top vise is ruggedly constructed, it is formed of solid metal, it has considerable weight and is relatively costly. Although the aforementioned vise provides satisfactory gripping of workpieces at a workbench, their size, weight and configuration do not lend to ready portability of the vise and such a vise is considered to be stationary and not convenient to movement from work place to work place.

In providing a vise suitable for relatively moderate to light working operations and hobby activities and which can be used free standing or can be readily mounted and demounted, the aforementioned vise arrangement has been scaled down in size. While portability is imparted to the latter type of vise, nonetheless this form of vise is fabricated of metal, is still relatively heavy and costly, has a substantially limited jaw opening and does not provide a desired angularity control between the vise jaws, a feature which is often desirable in various working applications.

SUMMARY OF THE INVENTION

Accordingly, it is an object of this invention to provide an improved vise.

Another object of the invention is to provide an improved vise for supporting a workpiece during relatively moderate to light working operations.

Another object of the invention is to provide an improved vise for stationary or portable use, which is of relatively light weight and which can be economically fabricated.

Another object of the invention is to provide a portable vise for supporting a workpiece during relatively moderate to light working operations and which has an enhanced gripping jaw spacing for supporting relatively large workpieces.

Still another object of the invention is to provide a portable vise for supporting an elongated workpiece during relatively moderate to light working operations and having an improved arrangement for providing clearance of a vertically supported elongated workpiece.

Another object of the invention is to provide an improved portable vise having means for varying an angle between gripping jaw members of the vise.

Another object of the invention is to provide an improved vise which can be used free standing and which is readily mounted to and demounted from a worktable.

A further object of the invention is to provide an improved vise for use by model makers and hobbyists.

In accordance with features of the vise of this invention, a support means for first and second workpiece-gripping jaw members is provided including a support body having a frame member and an integrally formed bowl shaped member. The frame member which extends in a principal plane includes an aperture and provides a support surface for the jaw members for movement thereof in a direction parallel to the principal plane and adjacent the aperture. The bowl shaped member extends transversely to the principal plane and communicates with the aperture. The support means further includes a base body having a cavity formed therein. The cavity is adapted for receiving and seating a bottom segment of the bowl member, and, a curved surface of the cavity engages a curved surface of the bowl member for sliding engagement therebetween. A restraining means is provided which captivates the support body in the cavity and alternatively enables sliding movement of the bowl member or maintains the bowl member at a preselected orientation. A means is provided for mounting the jaw members to the frame member for varying the relative spacing therebetween for gripping a workpiece. The support means is formed of a relatively light and relatively economic material and preferably a polymer plastic. The vise arrangement is advantageous in that it is fabricated of a relatively lightweight, relatively low cost material yet is adapted to sustain relatively moderate to light working forces which are impressed on a gripped workpiece and which are distributed from the workpiece through the frame member, the bowl member, and the base body to a support surface for the vise.

In accordance with another feature of the invention, the support body provides for a limited extension of an elongated workpiece through the frame aperture and into the interior of the bowl. The gripped workpiece can thereby be centrally orientated on the vise.

In accordance with other features of the invention, the frame member provides a means for supporting the jaw members adjacent a surface thereof, and enables the jaw members to be relatively widely spaced along a length of the frame member for supporting a relatively large workpiece. A means for varying the relative spacing between the jaw members is adapted to provide for positioning of faces of the jaw members in an anti-parallel attitude thereby enabling gripping of a wedge shaped or a tapered workpiece.

BRIEF DESCRIPTION OF THE DRAWINGS

These and other objects and features of the invention will become apparent with reference to the following specification and to the drawings wherein:

FIG. 3 is a fragmentary bottom view of a support body of FIG. 1;

FIG. 4 is a side elevation view of the support body of FIG. 3;

FIG. 5 is a side elevation view of the vise of FIG. 1 illustrating a frame member of the vise at alternate orientations;

FIG. 6 is a fragmentary view taken along lines 6—6 of FIG. 1;

FIG. 12 is a bottom view of an alternative embodiment of a locking means of the invention;

FIG. 13 is a view along line 13—13 of FIG. 12 illustrating non-interfering engagement between surfaces;

FIG. 14 is a side elevation view of the locking means of FIG. 12 illustrating an interference between surfaces;

FIG. 16 is an enlarged fragmentary view in section of a swivel mounting arrangement; and, FIG. 17 is a fragmentary view of a jaw member illustrating the mounting of a jaw member clad body.

DETAILED DESCRIPTION

Figure 2:
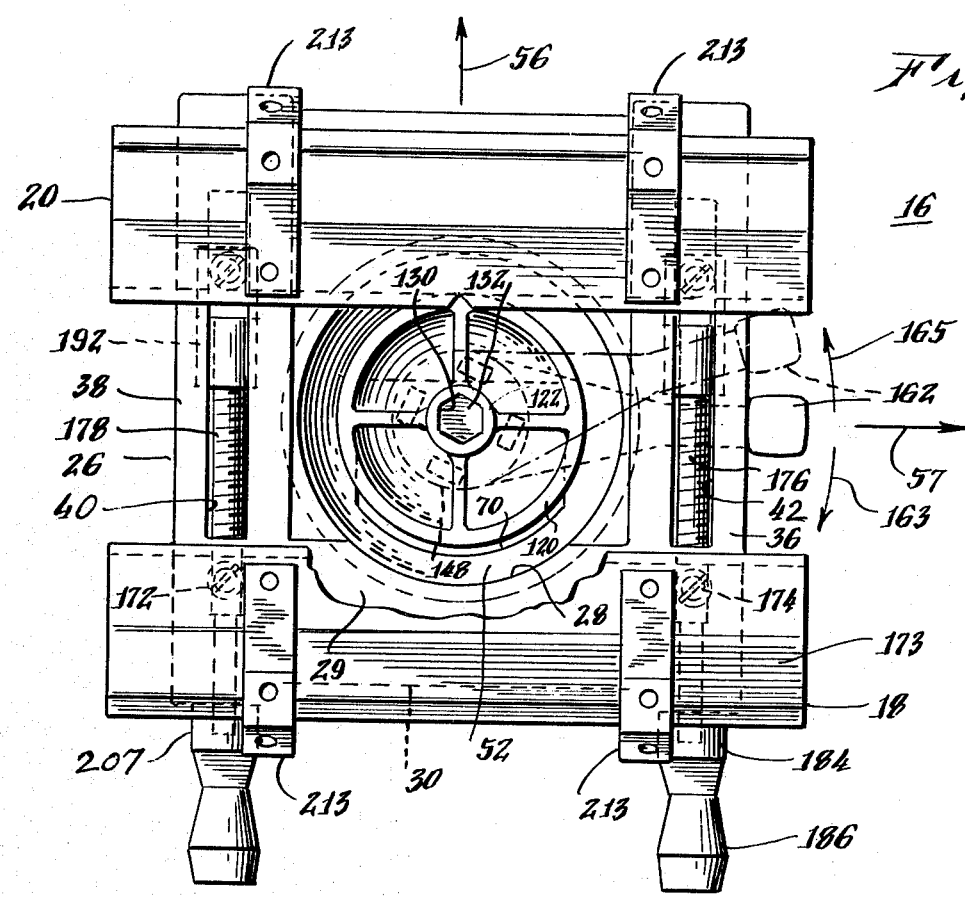
FIG. 2 is a plan view of the vise of FIG. 1.

Referring now to the drawings and particularly to FIGS. 1-4, a vise 16 of the invention is shown supported on a surface 17 of a workbench or a support table. The vise 16 includes first and second workpiece gripping jaw members 18 and 20, constituting elongated clamping jaws, and a means for supporting these members. The vise support means comprises a support body 22 and a base body 24. Support body 22 comprises an integrally formed substantially rectangular frame member 26 and an integrally formed bowl shaped member 28. The jaw members 18 and 20, the support body 22 and the base body 24 are preferably integrally molded from a suitable material, such as a structural foam polymer plastic.

The frame member 26 includes a top surface segment 29 and a peripheral skirt segment 30, constituting a peripheral depending front edge and respective side edges. As shown more clearly in FIG. 3, the frame has a length 31 and a width 32. The surface segment 29 includes parallel aligned segments constituting top coplanar surfaces 36 and 38 each having elongated slots 40 and 42 formed therein. An aperture 52 (FIG. 2) is provided in the surface and extends in the direction of a plane defined by the mutually perpendicular axes 56 and 57 (FIG. 2). As shown in the drawings, particularly FIG. 2, the aperture 52 extends between the top coplanar surfaces 36, 38 and substantially to the maximum extent of opening between the clamping vise jaws 18, 20. The first jaw member 18 is stationary, being supported longitudinally on top of the frame (transversely of the coplanar surfaces thereof) as shown in the drawings, and is mounted to the surfaces 36 and 38 as indicated in more detail hereinafter. The second jaw member 20 also supported longitudinally on top of the frame, extends transversely between the coplanar surfaces 36 and 38, and, as indicated hereinafter, is advanced toward and retracted from the stationary member 18 for respectively gripping and releasing a workpiece 60 as shown in FIG. 5 or a workpiece 61 as shown in FIG. 6.

The bowl member 28 communicates with the aperture 52 of the frame member and is substantially coterminous therewith. As shown in the drawings, the bowl member 28 is integrally molded with the frame (or is otherwise secured thereto) and depends below the aperture and the frame. The bowl member 28 which has a longitudinal axis 62 extends from the aperture 52 of the frame member in the direction of its longitudinal axis. The bowl member 28 includes a curved spherical segment 64 (FIG. 4) shown to be a thin walled hollow hemisphere and having a curved surface segment 66 located at a bottom section 67 of the member, thereby providing a lowermost convex portion of the bowl member 28. The bowl member 28 has a depth extending in the direction of its longitudinal axis 62 which enables extension of an elongated workpiece into an interior of the member. The bowl member can comprise a hollow hemispherical body or it includes an extension segment such as the integral cylindrical segment 69 (FIG. 4) which is positioned between the spherical segment 64 and the aperture 52. A cut-out or enlarged opening 70 is formed in the spherical segment through which a component of a restraining means extends, as is indicated in greater detail hereinafter.

The base body 24 includes a plurality of upstanding side wall segments 74, 76, 78 (FIG. 1) and 80 (FIG. 7) which provide an elevated platform surface or top portion 82 in which a depending cavity 84 is formed. The cavity 84 includes a curved or concave surface 86 (FIG. 7) which conforms with, and is complementary to, the curvature of the convex surface 66 of the bowl segment 64. Cavity 84 is thus adapted to receive and seat the bowl member 28 for sliding engagement therebetween, thereby providing for a swivel adjustment between the bowl member and the base. A plurality of feet 89 are mounted to the bottom surface for spacing the base body from the table surface 17. These feet made of a polymer for example provide against movement and slippage of the vise and avoid scratching of a finished surface 17.

A restraining means is provided for captivating the bowl member 28 in the cavity 84 and for alternatively enabling sliding movement between the surfaces 66 and 86 or maintaining the bowl member 28 at a preselected orientation. The restraining means constitutes a quick-release clamping means and includes a clamping element or lock body 120 (FIG. 7) shaped as a spherical segment which is positioned within the bowl member 28. A spherically curved surface 124 conforms in surface configuration with a spherically curved surface 125 of the interior of the bowl 28. Body 120 includes a hub segment 122 and a key shaped boss 123 extending axially from the hub segment 122 through the cutout 70 and into the base body 24. A hexagonal shaped aperture 130 is formed in the hub segment 22 and a cylindrical shaped bore 131 of reduced diameter is formed in the hub and in the boss 123. A fastening element constituting a rod 132, having a hexagonal head engages the hexagonal aperture 130 and rotation thereof is inhibited.

The restraining means further includes a cylindrically shaped body hub 133 integrally formed on the base body and through which a key shaped aperture 134 extends. The key shaped boss 123 of body 120 engages aperture 134 and inhibits rotary movement of the body 120. An annular array of raised ramp shaped segments 140, 142, 144 and 146 are integrally formed on a surface 136 of hub 133.

Figure 10:
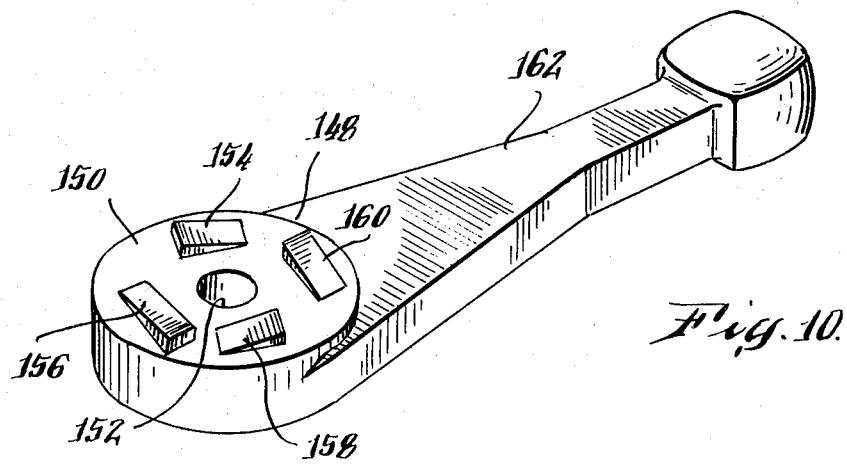
FIG. 10 is an enlarged perpective view of a locking lever utilized with the vise of FIG. 1.

A manually-manipulatable locking lever 148 is provided having a surface 150, an aperture 152 formed therein, and an annular array of ramp shaped segments 154, 156, 158 and 160 which are integrally formed with the lever 148 and extend from the surface 150. The ramp segments are arrayed for providing that each ramp segment increases in height in a predetermined direction as, for example, in a counterclockwise direction as shown in FIG. 10. The lever 148 is maintained in engagement with the surface 136 of the base body hub 133 by the screw 132 which extends through the aperture 152 in the lever arm 148, a washer 164 and a locking nut 166. The lock lever 148 includes a lever arm segment 162 which extends through the opening 90 formed in the side wall of the base body. As shown in FIG. 5, this opening includes a ratchet shaped segment 167 extending to a notch 168. Upon rotation of the lever arm 162 in a first direction 165 (FIG. 2), the ramp segments 140, 142, 144 and 146 are forced into engagement with the corresponding ramp segments 154, 156, 158 and 160, thereby forcing the screw 132 to advance in an axial direction toward the base body 24. The effect of movement is determined by the relative positioning of ramp segments 140-146 and 154-160. As shown, the lever arm is advanced about 30° to 60° to establish interference. The captivating spherical body 120 then exerts a force on the spherical segment 64 which is positioned between this body and the cavity surface 86. Movement of the bowl member 28 and support body is inhibited and it is maintained at a preselected orientation. By rotating the lever arm segment 162 in a second opposite direction 163 (FIG. 2), the ramp segments are disengaged, the sandwiching force established by the spherical body 120 on the bowl member 28 is released and the bowl member, although captivated in the cavity, can be reorientated by the application of hand pressure. Upon reorientation, the bowl member 28 can then be locked in the selected position by advancing the lever arm in the opposite direction 165. A tool 169 (FIG. 11), such as a wrench, may be extended through the aperture 90 for adjusting nut 166 to compensate for wear. FIGS. 12, 13 and 14 illustrate an alternative cammed surface configuration wherein surfaces 136 and 150 are cammed or annularly tapered to provide interference therebetween. FIG. 13 illustrates noninterfering engagement while FIG. 14 illustrates the lever 148 rotated for establishing interference.

Figure 1:
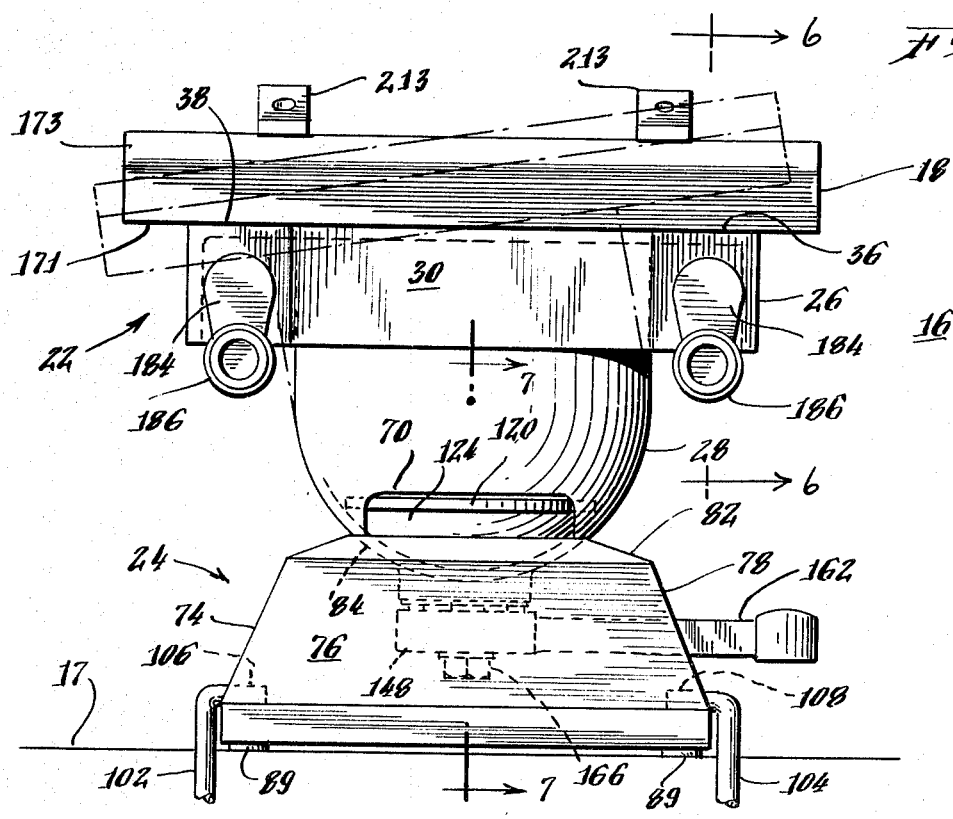
FIG. 1 is a front elevation view of a vise constructed in accordance with the feature of this invention.
Figure 7:
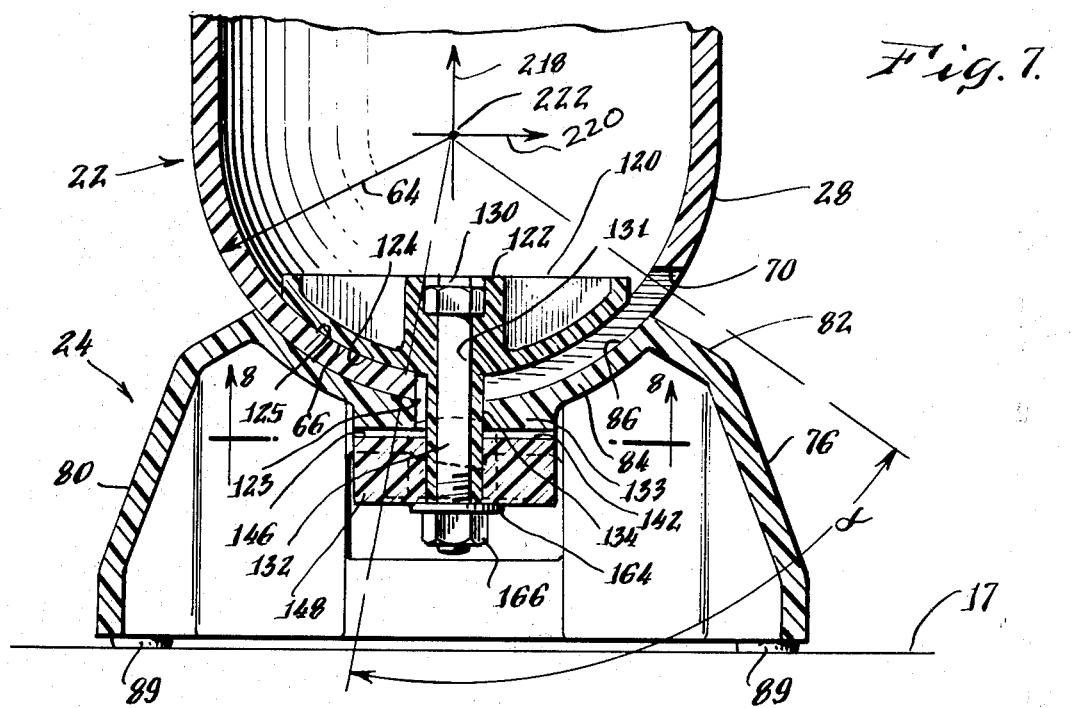
FIG. 7 is a fragmentary view taken along lines 7—7 of FIG. 1.
Figure 8:
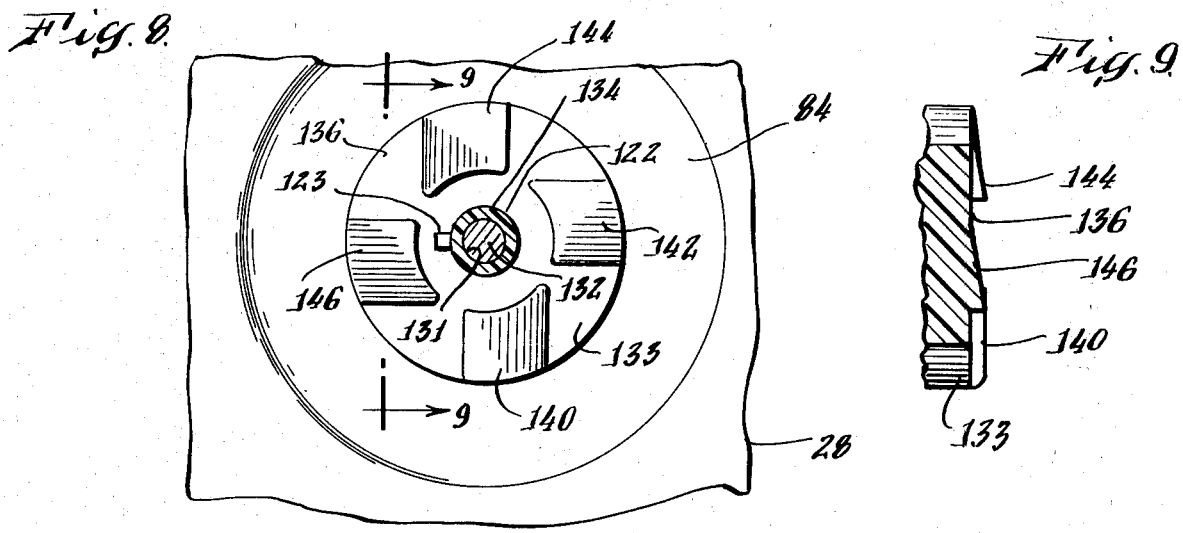
FIG. 8 is a fragmentary view taken along lines 8—8 of FIG. 7.
Figure 9:
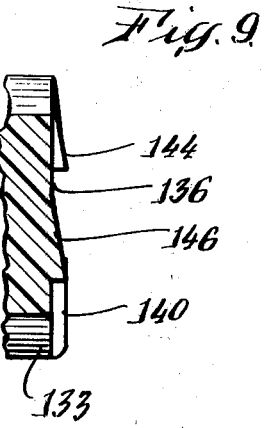
FIG. 9 is a fragmentary view taken along lines 9—9 of FIG. 8.
Figure 11:
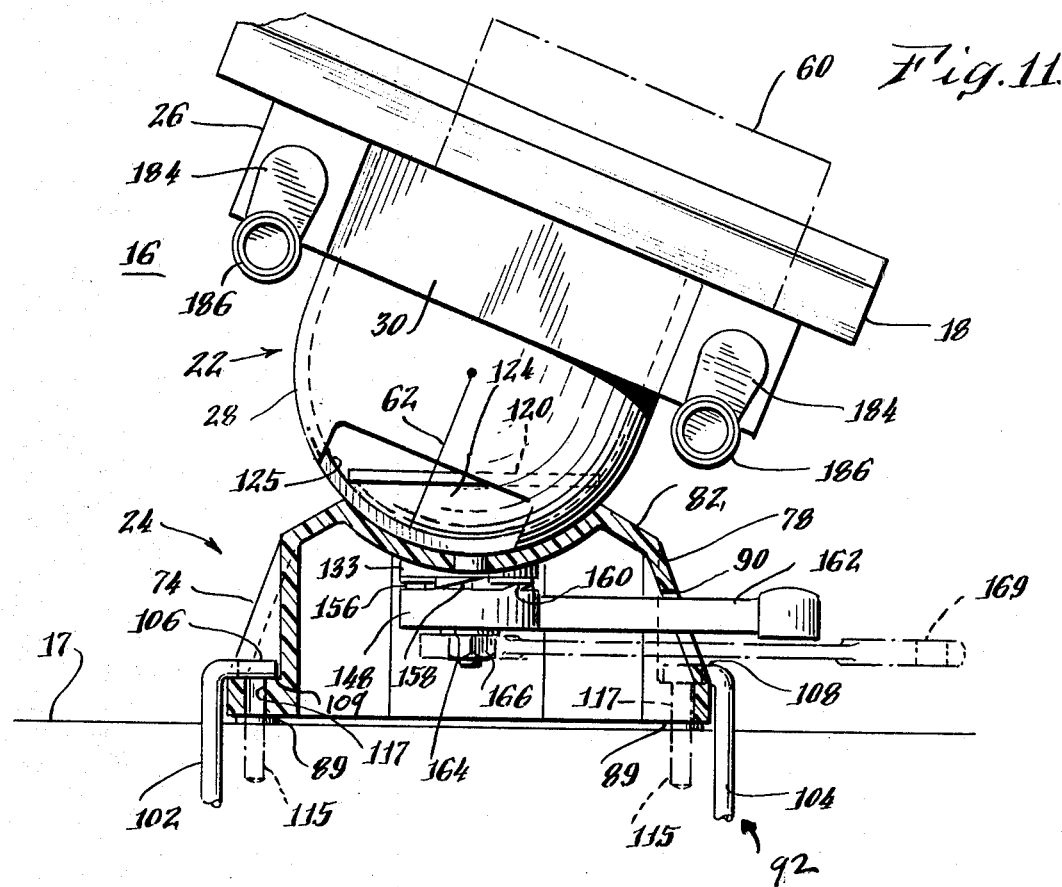
FIG. 11 is a view of the vise of FIG. 1 in a preselected orientation and partly broken away to illustrate a restraining means.

The bowl member 28 is advantageously adjustable in the cavity and has substantial freedom of movement in order to present the workpiece at a desired attitude. The extent of reorientation and movement of the bowl member 28 in the cavity about three axes is determined by the size and configuration of the cutout 70. The cutout 70 is configured and sized to provide on the one hand a substantial degree of unlimited movement, and, on the other hand, to provide a bowl surface segment 66 having an area sufficiently large to assure mechanical integrity of the bowl in supporting the bowl member and for enabling restraint of the same upon the application of a sandwiching force by the spherical body 120. The restraining arrangement is advantageous in that the spherical configuration of the body 120 applies a restraining force across a gap of the cutout and contributes to the rigidity of the bowl member in the area of the cutout. The cutout 70 is at least coextensive with the axis 218 (FIG. 7) thereby enabling the bowl member 28 to rotate 360° about this axis. The cutout is formed for providing that the bowl member may be rotated an angular distance ($\alpha$) about an axis 222 (FIG. 7). Since the bowl member 28 can be rotated 360° about an axis 218, the angular rotation ($\alpha$) is effectively doubled. Orientation about the axis 222 is shown in FIG. 5. The cutout is also shaped to enable rotation for an angular distance ($\theta$) (FIG. 4) about axis 220. Various orientations about the axis 220 are illustrated in FIGS. 1 and 11. Thus, a substantial degree of freedom is provided for reorientating the support body 22 to a desired attitude. The size and configurations of the cutout can be varied to suit particular needs. It has been found that the angles ($\alpha$) and ($\theta$) can equal 40° and 20° respectively while providing sufficient structural integrity for a hemispherical segment 64 formed of a structural polymer foam having a radius of 51 mm and a wall thickness of 5 mm. The restraining means thus described is disclosed and claimed in copending U.S. Patent Application, Ser. No. 79-3574 which is filed concurrently herewith and which is assigned to the assignee of this invention.

Figure 15:
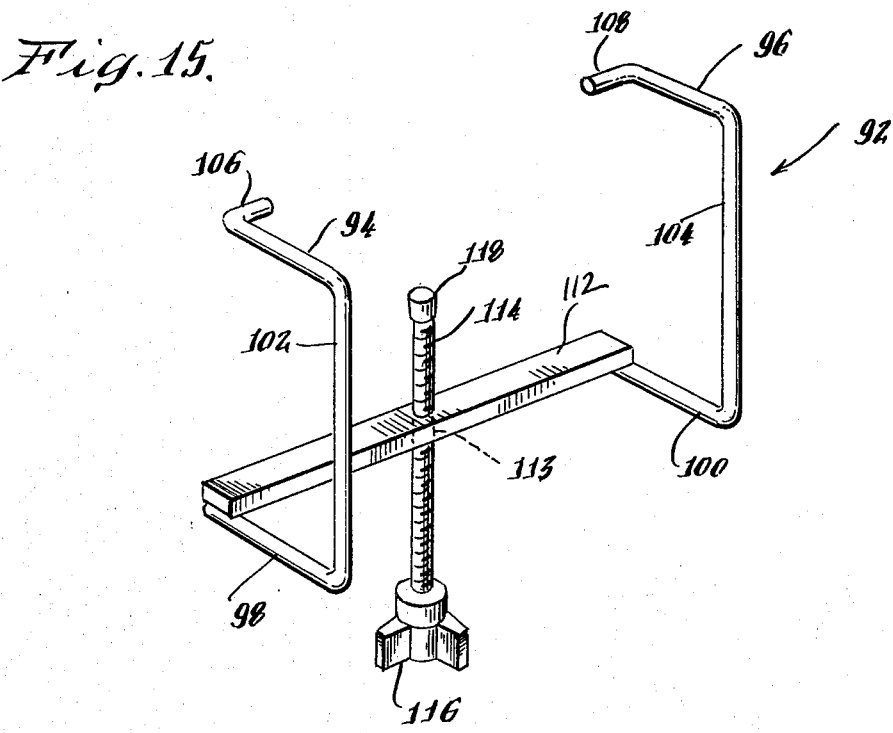
FIG. 15 is an enlarged perspective view of a means for mounting the vise of FIG. 1 to a support surface.

A quick connect and disconnect mounting means comprises a clamp 92 (FIG. 5, 11 and 15) which is provided for mounting and demounting the base body 24 to the surface 17 of a worktable or bench top. The clamp 92 comprises a formed wire body having horizontal segments 94 and 96 which extend over an upper surface of the work support table, horizontal segments 98 and 100 which extend below a lower surface of the worktable, vertical segments 102 and 104, and segments 106 and 108 for engaging surfaces 109 and 110 in the base body 24. A plate 112 is provided and extends between the lower horizontal segments 98 and 100. An aperture 113 is formed in the plate and a screw 114 engages and extends through the aperture. The screw 114 includes a knob 116 and a tip 118 mounted at opposite ends of the screw for respectively rotating the screw and for engaging the lower section of the worktable. Alternatively, the vise 16 can be screw mounted to a table by screws 115 extending through apertures 117 in the segments 106 and 108 or it can be utilized freestanding without use of any mounting members.

The first gripping member 18 comprises an elongated stationary member having a lower, flat surface 171 engaging support surfaces 36 and 38 (FIGS. 1,2) and an upper beveled surface 173. This member is mounted to the frame by screws 172 and 174. The second jaw member 20 is transported by means including first and second, elongated, rotatably mounted and independently-operated screw-threaded rods 176 and 178 (hereinafter referred to as "screws"). Apertures 180 and 182 (FIG. 3) formed in the frame member 26 provide for support of the screws at one end thereof. The arrangement of the screw support and jaw member transport is similar for each of the screws 176 and 178. The following description, which is applicable to the screw 176, is equally applicable to screw 178 and similar components are provided for supporting the screw 178. A distal segment of the screw 176 extends through the aperture 180 (FIG. 6) and engages a bore 181 of a crank arm 184. A rotatable knob 186 is pressed on and captivated by a lever segment 183 of the crank arm. A plate or washer 188 is positioned on the screw adjacent a wall segment of the frame member and a pin 190 extends through a transverse bore 191 in the screw for inhibiting longitudinal movement of the screw through the aperture. The pin and washer as well as a surface 193 on the crank arm inhibits movement of the screw 176 in an axial direction. The screw 176 is supported at another location along its length and is mechanically coupled to the transported jaw 20 by a travel body or pivot nut 192. The body 192 includes an internally threaded bore 198 which is engaged by the screw 176. A shoulder 200 is formed on the body 192 and an aperture 201 is formed therein. A screw 202 extends through this aperture and engages the gripping member 20 in a bore 205. The screw 202 while engaging the gripping member 20 includes a flat head segment 203 which is freely rotatable in the aperture 201. Upon manual rotation of the crank arm 184, the screw 176 rotates causing movement of the travel body 192 in an axial direction in accordance with the direction of the rotation of the crank. Screw 202 extends through the elongated slot 42 formed in the frame member 26 surface 38 and causes jaw member 20 to travel therewith. As indicated, a similar support arrangement is provided near an opposite end of the member 20. By rotating cranks 184 and crank 207, the jaw member 20 is advanced and retracted relative to the stationary member 18 with jaw faces 209 and 211 (FIG. 6) thereof parallel. By rotating only a single crank or by rotating the crank at different rates, the jaw faces 209 and 211 are positioned anti-parallel. This is advantageous in that tapered and wedge shaped workpieces can be conveniently gripped by the jaw faces. A workbench which exhibits the angularity control is disclosed in U.S. Pat. Nos. 3,615,087, 3,841,619 and 4,076,229 to Arnold Hickman which are assigned to the Assignee of this invention.

In addition to gripping a workpiece directly with the jaw faces, the workpiece can be gripped through the use of swivel members 213 which are rotatably positioned in apertures 215 (FIG. 16) formed in a jaw member. A swivel includes a ridge 217 and swivels on opposite jaws are employed to support a workpiece which is positioned in the ridges 217. The jaws 18 and 20 are spaced apart as substantial distance in the described arrangement by advancement of the transportable member 20 along the frame member surface. This spacing is further increased through the use of the swivels 213.

At times, relatively hard workpiece materials, such as metals, are gripped which can deform relatively soft faces of the jaws members. On other occasions, the jaw members will grip relatively softer materials. In order to accommodate these different materials without deformation of the jaw faces or workpiece, an elongated, angle shaped jaw face cladding member 230 (FIG. 17) is provided and is supported on a jaw member 18. The clad member 230 includes a segment 232 which extends parallel to and adjacent a gripping jaw member face 234. The clad member 230 includes an aperture 236 formed in another integral angle segment 238 which extends along a surface 240 of the jaw. Aperture 236 is located adjacent a swivel receiving cavity 242 and the segment 238 is sandwiched between the swivel member 213 and the jaw member 18. An integral stud 244 of swivel member 213 extends through the aperture 236 in the clad member 230 and into the cavity 242 formed in jaw member 18 thereby mounting the clad member 230 at a fixed location along the jaw member. A second similar aperture, not shown, is formed along the segment 238 for alignment with a second swivel receiving cavity in the jaw member. A second clad member, not shown, is provided and is similarly mounted to the other jaw member 20. The clad member 230 is formed of metal, polymer plastic, fiber or other suitable gripping material. This mounting of the clad member 230 is advantageous in that the clad members are mounted to the jaws members without the need for additional mounting members.

An improved portable or stationary vise for moderate or relatively light working operations has thus been described. The vise 16 will support a workpiece subjected to relatively moderate to light pounding, hammering, etc. and during other working operations. It is particularly useful for hobby work, arts and crafts. The use of a support body including a frame and a bowl shaped member enables a relatively low cost, light weight vise to be fabricated of a material such as a polymer plastic yet which can support a workpiece during the application of relatively moderate or relatively light working forces on the workpiece. The vise can be orientated about three axes in a plurality of different attitudes and is locked at a selected orientation. The described arrangement further enables a limited extension of centrally gripped elongated workpieces into the interior of the bowl shaped member. The use of a frame member for supporting the gripping jaw members enables relatively wide spacing of these jaw members in a portable arrangement and the angularity jaw control enables gripping of tapered pieces and other non-linear arrangements.

While there has been described a particular embodiment of the invention, it will be apparent to those skilled in the art that variations may be made thereto without departing from the spirit of the invention and the scope of the appended claims.

What is claimed is:

1. A small compact lightweight portable vise suitable for use by model makers and hobbyists, comprising a frame having a pair of substantially-flat top coplaner surfaces spaced from one another, a pair of elongated clamping jaws supported longitudinally on top of the frame and transversely of the coplanar surfaces thereof, means fixing one of the jaws to the frame, means mounting the other jaw on the frame for non-parallel movement towards and away from the fixed jaw, whereby tapered objects may be clamped between the jaws, the top of the frame having a central aperture disposed between the coplanar surfaces and the clamping jaws, the aperture extending substantially to the maximum extent of opening between the clamping jaws, a member secured to the frame and depending below the aperture, the member being substantially coterminous with the aperture, whereby an odd-shaped enlarged workpiece may be received within the member and yet may be clamped between the jaws, the member having a lowermost convex portion, a base having a complementary concave portion for supporting the member thereon, whereby the frame and hence the clamping jaws may be swivel adjusted with respect to the base, and means for clamping the member to the base in a desired adjusted position.

2. A small compact lightweight portable vise suitable for use by model makers and hobbyists, comprising an integrally-molded rectangular frame having a pair of substantially-flat top coplanar surfaces spaced from one another, a pair of elongated clamping jaws supported longitudinally on top of the frame and transversely of the coplanar surfaces thereof, means fixing one of the jaws to the frame, means mounting the other jaw on the frame for non-parallel movement towards and away from the fixed jaw, whereby tapered objects may be clamped between the jaws, said last-named means including a pair of screw-threaded rods mounted in the frame and respective pivot nut members carried by the moving jaw for engaging the rods, the top of the frame having a central aperture disposed between the coplanar surfaces and the clamping jaws, a bowl member integrally formed with the frame, the bowl member depending from the aperture and below the frame, whereby an enlarged workpiece may be received within the bowl member and yet may be clamped between the jaws, the bowl member having a lowermost convex portion, a base having a complementary concave portion for supporting the bowl member thereon, whereby the bowl member may be swivel adjusted relative to the bowl, and quick-release means for clamping the bowl member to the base in a desired adjusted position.

3. A small compact lightweight portable vise suitable for use by model makers and hobbyists, comprising an integrally-molded rectangular frame having peripheral depending side edges including a front edge and further including respective side edges, the frame further having a pair of substantially-flat top coplanar surfaces spaced from one another, a pair of elongated clamping jaws including a front jaw and a rear jaw supported longitudinally on top of the frame and transversely of the coplanar surfaces thereof, means fixing the front jaw to the frame, means mounting the rear jaw on the frame for movement towards and away from the fixed jaws in a non-parallel relationship with respect to the fixed jaws, whereby a tapered workpiece may be clamped between the jaws, said last-named means including a pair of independently-operable screw-threaded rods rotatably mounted in the front edge of the frame and retained therein against axial movement, the rods being disposed within the frame inwardly of the respective side edges thereof, the coplanar surfaces having respective slots formed therein, respective pivot nut members carried by the moving rear jaw and extending through the slots for engaging the rods, the top of the frame having an aperture formed therein between the jaws and the coplanar surfaces, a member formed integrally with the frame, the member depending from the aperture between the rods and below the frame, whereby an enlarged workpiece may be received within the member and yet may be clamped between the jaws, a base for supporting the member, means for adjusting the orientation of the member with respect to the base, and clamping means for securing the member to the base in a desired adjusted position.

4. A small compact lightweight portable vise suitable for use by model makers and hobbyists, comprising a frame having a pair of clamping jaws supported thereon, means for moving the jaws relative to one another for clamping a workpiece therebetween, the frame having an aperture formed therein between the clamping jaws, a bowl member secured to the frame, the bowl member being substantially coterminous with the aperture and depending beneath the aperture and below the frame, whereby a workpiece disposed within the bowl member may be clamped between the jaws, the bowl member terminating in a lowermost convex portion having an opening formed therein, a base having a complementary concave portion for supporting the bowl member thereon, whereby the bowl member may be swivel adjusted relative to the base member, means for supporting the base on a bench or table, and cam-actuated quick-release clamping means for securing the bowl member to the base, said clamping means including a clamping element within the bowl member and a fastening element secured to the clamping element and extending through the opening in the convex portion of the bowl member, whereby the degree of swivel adjustment of the bowl member relative to the base is limited by the opening in the bowl member.

5. A small compact lightweight portable vise suitable for use by model makers and hobbyists, comprising a frame having a pair of vise jaws supported thereon, means for moving the jaws relative to one another for clamping a workpiece therebetween, said means including a pair of independently-operable screw-threaded rods and respective crank handles mounted to the rods and projecting forwardly of the vise, a member secured to the frame, depending below the frame, and having a lowermost convex portion, a base having a top portion and respective sides, means for supporting the base on a bench or table, the top portion of the base having a concave recess formed therein complementary to the convex portion of the member, whereby the member is supported on the base and swivel adjusted relative thereto, the convex portion of the member having an enlarged opening formed therein, a quick-release clamping means between the member and the base, said clamping means including a first clamping element received within the member adjacent to the opening therein, the concave portion of the base having an opening therein, the first clamping element having a portion extending through the opening in the base and keyed thereto, and a second clamping element within the base and having a manually-manipulatable lever portion extending through an opening in a side wall of the base, cam means formed between the second clamping element and the underside of the concave portion of the base, respectively, and notch means in the opening in the side wall of the base for retaining the lever portion of the second clamping element.

* * * * *